US010048699B2

(12) United States Patent
Inoue et al.

(10) Patent No.: US 10,048,699 B2
(45) Date of Patent: Aug. 14, 2018

(54) VEHICLE CONTROL APPARATUS

(71) Applicants: TOYOTA JIDOSHA KABUSHIKI KAISHA, Toyota-shi, Aichi-ken (JP); The University of Tokyo, Bunkyo-ku, Tokyo (JP); National University Corporation Tokyo University of Agriculture and Technology, Fuchu-shi,, Tokyo (JP)

(72) Inventors: Hideo Inoue, Kanagawa-ken (JP); Masahiro Mio, Fuji (JP); Masayuki Okuwa, Nagakute (JP); Tsukasa Shimizu, Nagakute (JP); Minoru Kamata, Kawasaki (JP); Takuma Ito, Kashiwa (JP); Pongsathorn Raksincharoensak, Fuchu (JP); Masao Nagai, Fuchu (JP)

(73) Assignees: TOYOTA JIDOSHA KABUSHIKI KAISHA, Toyota-shi, Aichi-ken (JP); THE UNIVERSITY OF TOKYO, Bunkyo-ku, Tokyo (JP); National University Corporation Tokyo University of Agriculture and Technology, Fuchu-shi, Tokyo (JP)

(*) Notice: Subject to any disclaimer, the term of this patent is extended or adjusted under 35 U.S.C. 154(b) by 29 days.

(21) Appl. No.: 15/154,023

(22) Filed: May 13, 2016

(65) Prior Publication Data

US 2016/0334796 A1 Nov. 17, 2016

(30) Foreign Application Priority Data

May 15, 2015 (JP) ................................. 2015-100287

(51) Int. Cl.
*G05D 1/00* (2006.01)
*G05D 1/02* (2006.01)
(Continued)

(52) U.S. Cl.
CPC ........... *G05D 1/0278* (2013.01); *B60W 30/00* (2013.01); *G01C 21/00* (2013.01); *G05D 1/0246* (2013.01);
(Continued)

(58) Field of Classification Search
USPC ........................................................ 701/25
See application file for complete search history.

(56) References Cited

U.S. PATENT DOCUMENTS 9,229,453 B1 * 1/2016 Lee ...................... G05D 1/0214
2002/0013647 A1 * 1/2002 Kawazoe ................. B62D 1/28
701/41
(Continued)

FOREIGN PATENT DOCUMENTS

JP 9-243389 A 9/1997
JP 2005-265494 A 9/2005
(Continued)

OTHER PUBLICATIONS

Manabu Omae et al.: "Vehicle Motion Control for Automatic Driving in Local Area with Parking Space," Transactions of Society of Automotive Engineers of Japan, vol. 35, pp. 235-240 (2004).

*Primary Examiner* — Tyler Paige
(74) *Attorney, Agent, or Firm* — Sughrue Mion, PLLC

(57) ABSTRACT

A vehicle control apparatus includes: a storage apparatus configured to store a steering modification point of a vehicle and a vehicle speed target point of the vehicle that are associated with map information; and an electronic control unit configured to: detect a position of the vehicle; detect a travel direction of the vehicle; calculate a lane travel distance, the position of the vehicle, and the travel direction of the vehicle; generate, lane travel map data, a target direction of the vehicle, and a target vehicle speed of the vehicle, on the basis of the map information, the steering modification point, the vehicle speed target point, the position of the
(Continued)

vehicle, and the travel direction of the vehicle; and output a control signal to control the vehicle on the basis of the position of the vehicle, the lane travel distance of the vehicle, and the lane travel map data.

5 Claims, 11 Drawing Sheets

(51) Int. Cl.
    *B60W 30/00*    (2006.01)
    *G01C 21/00*    (2006.01)

(52) U.S. Cl.
    CPC ... *G05D 1/0274* (2013.01); *G05D 2201/0213* (2013.01)

(56) References Cited

U.S. PATENT DOCUMENTS

| | | | | |
|---|---|---|---|---|
| 2008/0161987 | A1* | 7/2008 | Breed | G08G 1/161 701/27 |
| 2009/0192683 | A1* | 7/2009 | Kondou | B60W 10/18 701/53 |
| 2009/0299573 | A1* | 12/2009 | Thrun | B62D 15/025 701/41 |
| 2011/0251748 | A1* | 10/2011 | Moran | B60T 8/1755 701/31.4 |
| 2011/0251749 | A1* | 10/2011 | Schwarz | B60T 7/12 701/31.4 |
| 2016/0195407 | A1 | 7/2016 | Sasaki | |
| 2016/0224849 | A1* | 8/2016 | Sakagami | G06K 9/00805 |
| 2016/0282468 | A1* | 9/2016 | Gruver | G01S 17/93 |
| 2016/0305794 | A1* | 10/2016 | Horita | G01C 21/3602 |
| 2016/0334796 | A1* | 11/2016 | Inoue | G05D 1/0278 |
| 2017/0008521 | A1* | 1/2017 | Braunstein | G01C 21/32 |

FOREIGN PATENT DOCUMENTS

| | | |
|---|---|---|
| JP | 2011-186577 A | 9/2011 |
| JP | 2012-14733 A | 1/2012 |
| JP | 2015-14985 A | 1/2015 |
| WO | 2015/029181 A1 | 3/2015 |

* cited by examiner

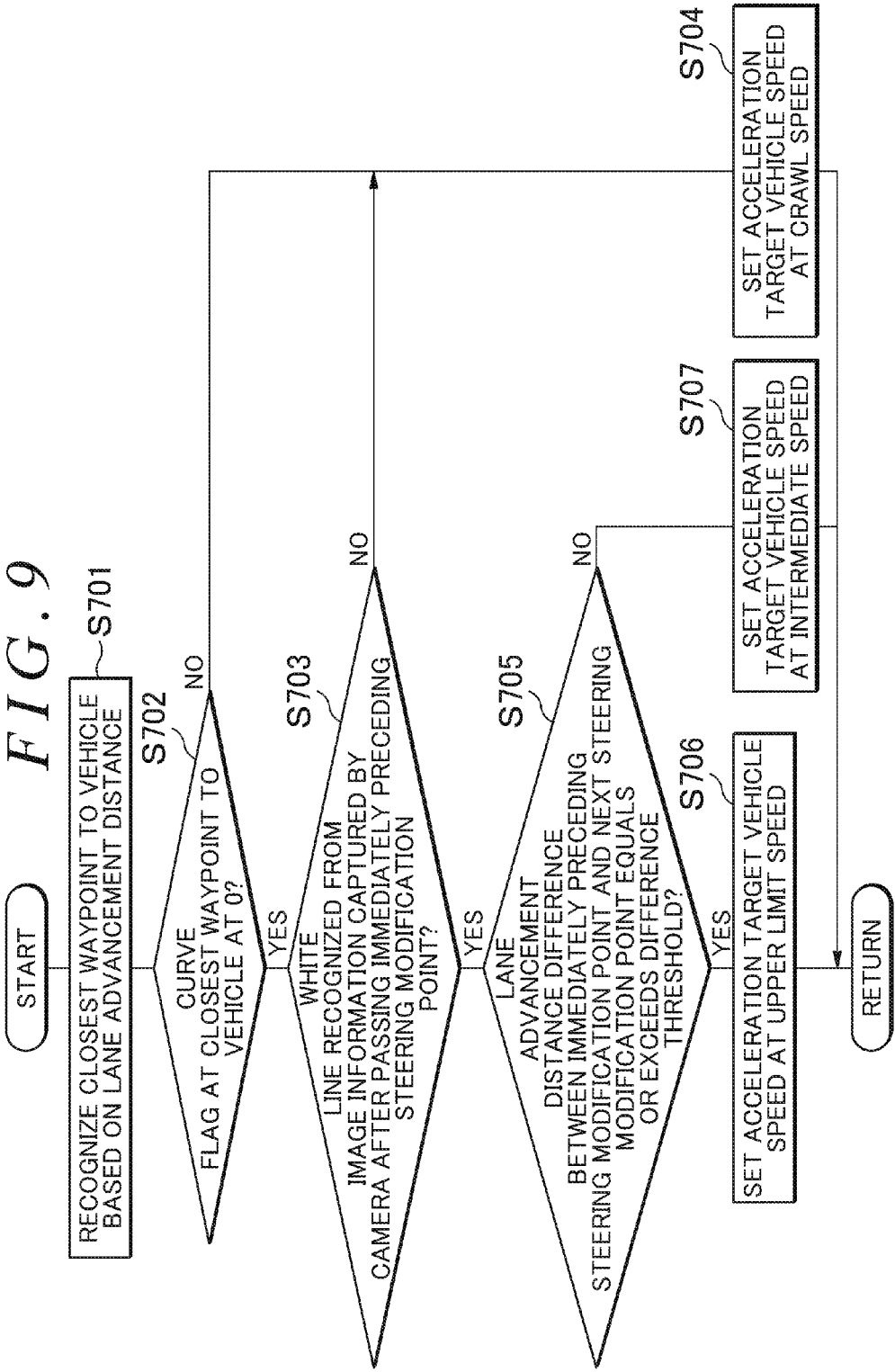

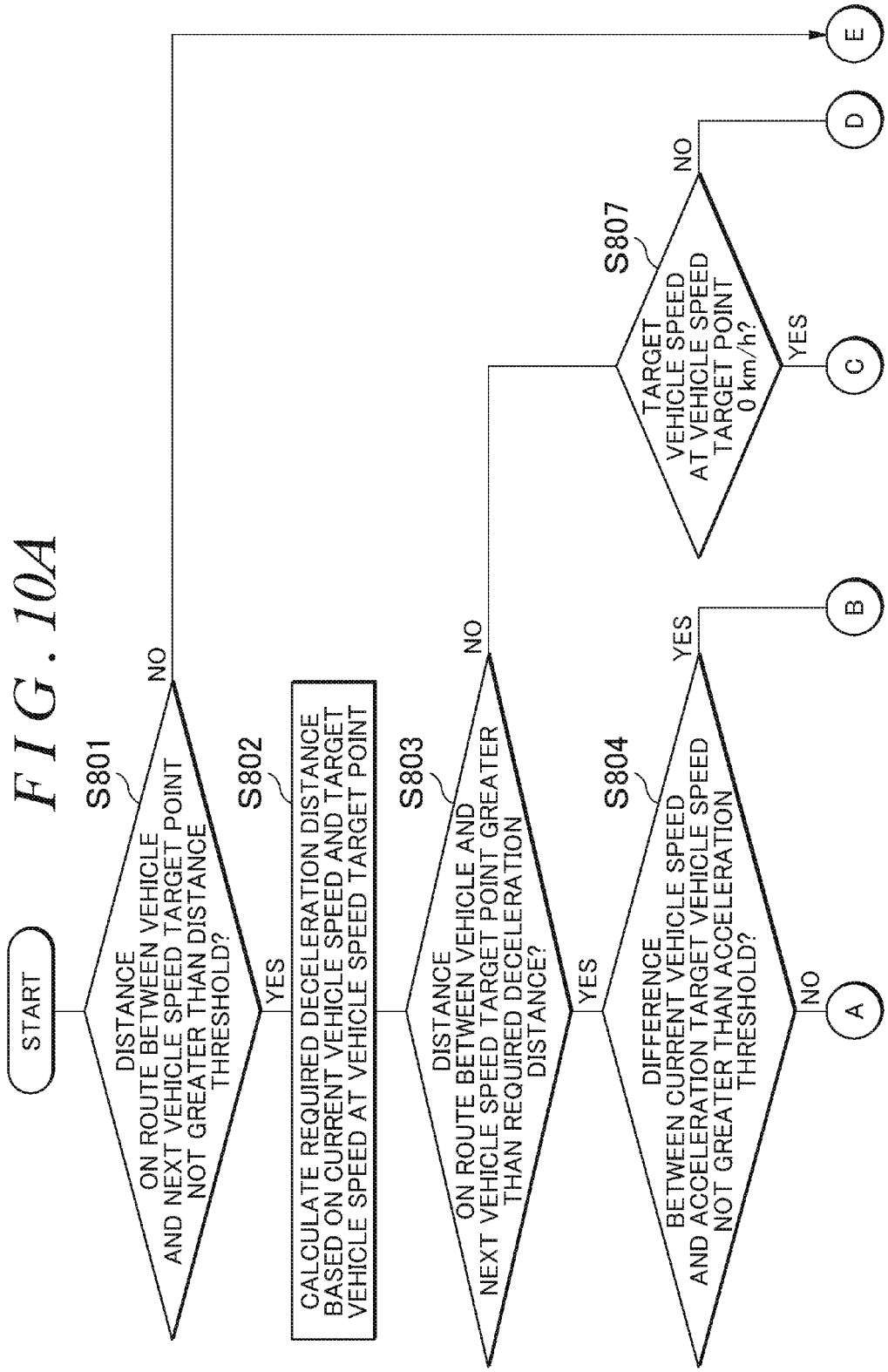

VEHICLE CONTROL APPARATUS

INCORPORATION BY REFERENCE

The disclosure of Japanese Patent Application No. 2015-100287, filed on May 15, 2015 including the specification, drawings and abstract, is incorporated herein by reference in its entirety.

BACKGROUND OF THE INVENTION

1. Field of the Invention

The invention relates to a vehicle control apparatus.

2. Description of Related Art

An automatic driving technique employing a real time kinematic global positioning system [RTK-GPS] is available in the related art with respect to a vehicle control apparatus that enables a vehicle to travel automatically. In a technique described in "Vehicle Motion Control for Automatic Driving in Local Area with Parking Space" by Manabu Omae, Naohisa Hashimoto, Hiroshi Shimizu, and Takehiko Fujioka, Transactions of Society of Automotive Engineers of Japan, Vol. 35, p. 235-240 (2004), a vehicle is caused to travel automatically using vehicle position information obtained from an RTK-GPS on the basis of target locus data generated by setting a target position of the vehicle at fixed distance intervals, for example every 15 cm.

However, to enable the vehicle to travel along a typical route from a current location to a destination using the technique described above, a large amount of target locus data must be prepared in advance. Further, to enable the vehicle to actually travel along the route, target vehicle speed data must also be prepared in advance at fixed distance intervals. It is difficult to store such a large amount of data in a database of the vehicle. On the other hand, when the vehicle attempts to obtain the data relating to automatic driving dynamically from a computer provided in a facility using high speed communication, a large amount of communication is required, leading to communication line congestion. Moreover, communication facilities may be insufficient, particularly in regional areas.

SUMMARY OF THE INVENTION

The invention provides a vehicle control apparatus that controls a vehicle to travel along a route from a current location to a destination using a small amount of data.

A vehicle control apparatus according to an aspect of the invention includes: a storage apparatus configured to store a steering modification point of a vehicle and a vehicle speed target point of the vehicle that are associated with map information; and an electronic control unit configured to: detect a position of the vehicle; detect a travel direction of the vehicle; calculate a lane travel distance that is a distance traveled by the vehicle along a lane from a lane entrance position in which the vehicle enters the lane, the lane forming a route that extends from a current location to a destination, on the basis of the map information, the position of the vehicle, and the travel direction of the vehicle; generate, for each lane, lane travel map data including a target position of the vehicle, a target direction of the vehicle, and a target vehicle speed of the vehicle, the target position, target direction, and target vehicle speed corresponding to the lane travel distance, on the basis of the map information, the steering modification point, the vehicle speed target point, the position of the vehicle, and the travel direction of the vehicle; and output a control signal to control the vehicle on the basis of the position of the vehicle, the lane travel distance of the vehicle, and the lane travel map data.

In the vehicle control apparatus according to the aspect described above, the lane travel map data used as the vehicle travels along the route are generated from steering modification points such as curves and vehicle speed target points such as temporary stop lines, which are associated with the map information. Hence, there is no need to store a large amount of data constituted by target positions and target vehicle speeds of the vehicle at fixed distance intervals at all times in association with the map information, and as a result, the vehicle can be controlled to travel along the route from the current location to the destination using a small amount of data stored in the point information storage unit of the vehicle. Moreover, according to this vehicle control apparatus, the lane travel map data are generated for each lane, and therefore continuity among the lane travel map data can be secured easily.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9 is a flowchart showing vehicle speed control executed by the vehicle control apparatus using the waypoint map; and FIG. 10A is a flowchart showing vehicle speed control executed by the vehicle control apparatus using the control target map.

DETAILED DESCRIPTION OF EMBODIMENTS

Figure 1:
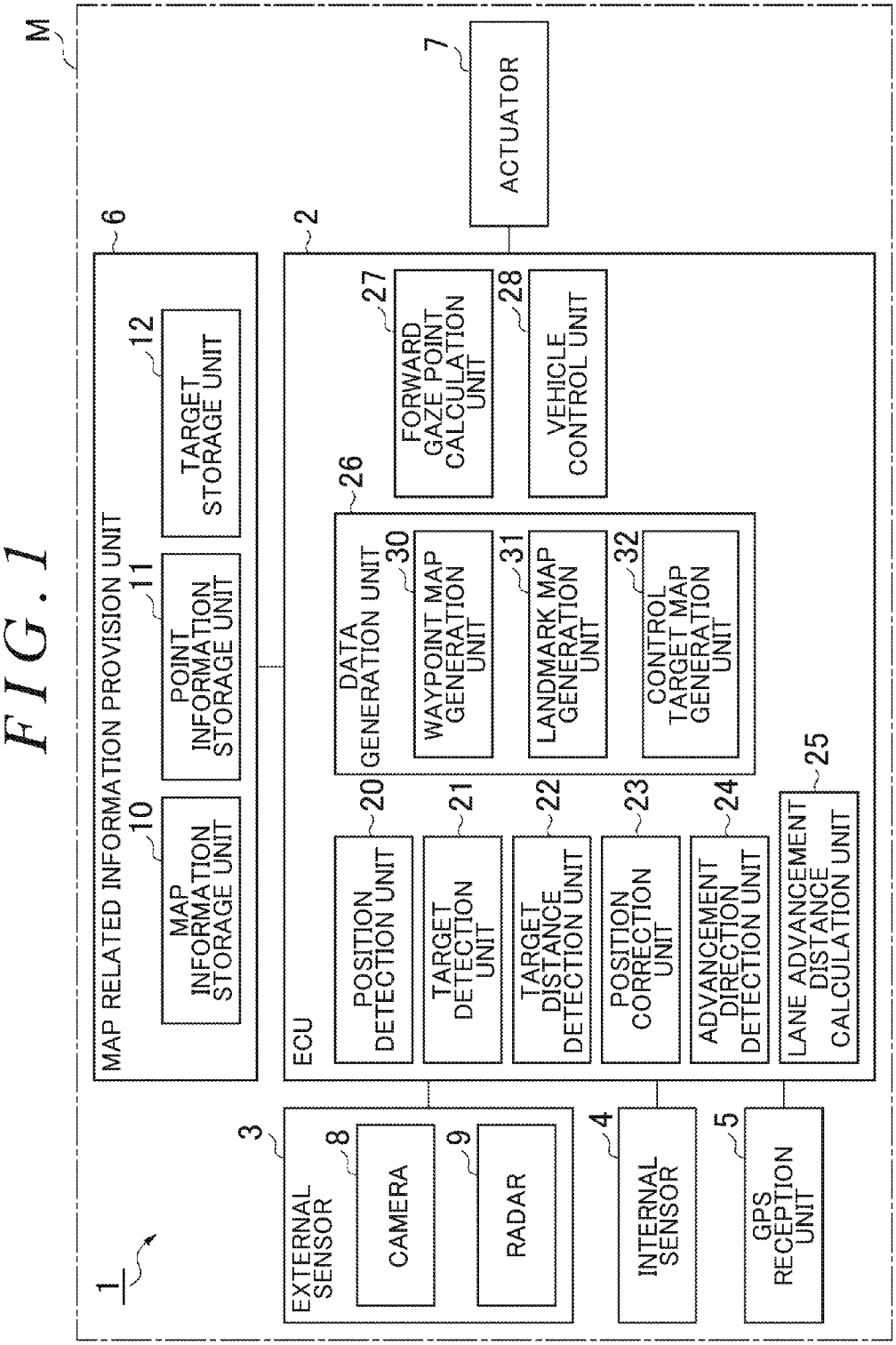
FIG. 1 is a block diagram showing a vehicle control apparatus according to an embodiment.

An embodiment of the invention will be described below with reference to the drawings. A vehicle control apparatus 1 according to this embodiment, as shown in FIG. 1, is installed in a vehicle M such as a passenger vehicle in order to control travel by the vehicle M. The vehicle control apparatus 1 controls the vehicle M to travel along a route from a current location of the vehicle M to a destination on the basis of map information.

The map information includes, for example, position information for each lane of a road, road shape information (for example, categories such as a curved shape and a rectilinear shape, as well as a road curvature), information indicating the number of lanes on the road, information indicating a legal minimum speed on the road, and information indicating a legal maximum speed on the road. The map information also includes information indicating positions of temporary stop lines, information indicating positions of intersections, and so on.

The destination may be a destination set manually by a driver using an input apparatus, not shown in the drawing, or a destination suggested automatically by a navigation system installed in the vehicle M. The navigation system automatically suggests (sets) a location in which the vehicle is frequently parked as the destination on the basis of a current location of the vehicle M and a travel history of the driver using a conventional method, for example. In this embodiment, a map related information provision unit 6 to be described below, for example, may function as the navigation system.

The route is constituted by roads (lanes) along which the vehicle M travels in order to reach the destination from the current location. The route may be set manually by the driver or suggested (set) automatically by the vehicle control apparatus 1 (the map related information provision unit 6, for example) on the basis of the current location and the destination. A conventional method may be used to set the route. Lanes are distinguished along the set route.

The vehicle control apparatus 1 is capable of enabling the vehicle M to travel from the current location to the destination by automatic driving, for example. Automatic driving is a driving condition in which the vehicle M travels automatically along the route without the need for the driver to perform driving operations.

The vehicle control apparatus 1 stores steering modification points and vehicle speed target points that are associated with the map information. The steering modification point is a location on a lane where a steering modification is performed by the vehicle M. More specifically, the steering modification points include curves and intersections. A curve is a location (a section) on a lane having a curvature of at least a fixed value. An intersection is a location (a section) where at least two roads intersect, and may be a crossroads or a T junction. A single steering modification point is set in relation to a single curve regardless of length of the curve, for example. Similarly, a single steering modification point is set in relation to a single intersection, for example.

Here, a lane is a strip form range of a road that is defined in a road width direction by a white line, and serves as a travel line along which the vehicle M travels. In this embodiment, the lane is partitioned in a length direction at each intersection, for example. A position in which the vehicle M enters a lane while traveling along the route is set as a lane entrance position. The lane entrance position is an intersection, for example. A distance by which the vehicle M advances along the lane from the lane entrance position is set as a lane travel distance. In other words, the lane travel distance is the distance on the lane from the lane entrance position. The position of the steering modification point in the length direction of the lane is defined on the lane by the vehicle advancement distance. The steering modification point is positioned in the center of the lane in the lane width direction, for example. For example, on a certain lane, a curve located at a lane travel distance of 100.0 m and an intersection located at a lane travel distance of 150.0 m are stored as positions of steering modification points.

The vehicle speed target point is a location on the lane where a target vehicle speed of the vehicle M is set. More specifically, the vehicle speed target points include temporary stop lines. The target vehicle speed at a temporary stop line is 0 km/h. The vehicle speed target points may also include pedestrian crossings and steep downhill slopes. A steep downhill slope is a location having a downhill road gradient that equals or exceeds a predetermined threshold. The target vehicle speed at a pedestrian crossing is crawl speed, for example (a speed of no more than 10 km/h or the like). The target vehicle speed on a steep downhill slope is 30 km/h, for example. The vehicle speed target points include target vehicle speed information and position information. Similarly to the steering modification points, positions of the vehicle speed target points in the length direction of the lane are defined on the lane using the vehicle advancement distance. For example, on a certain lane, a curve located at a lane travel distance of 125.0 m and an intersection located at a lane travel distance of 175.0 m are stored as positions of steering modification points on the lane.

Figure 2A:
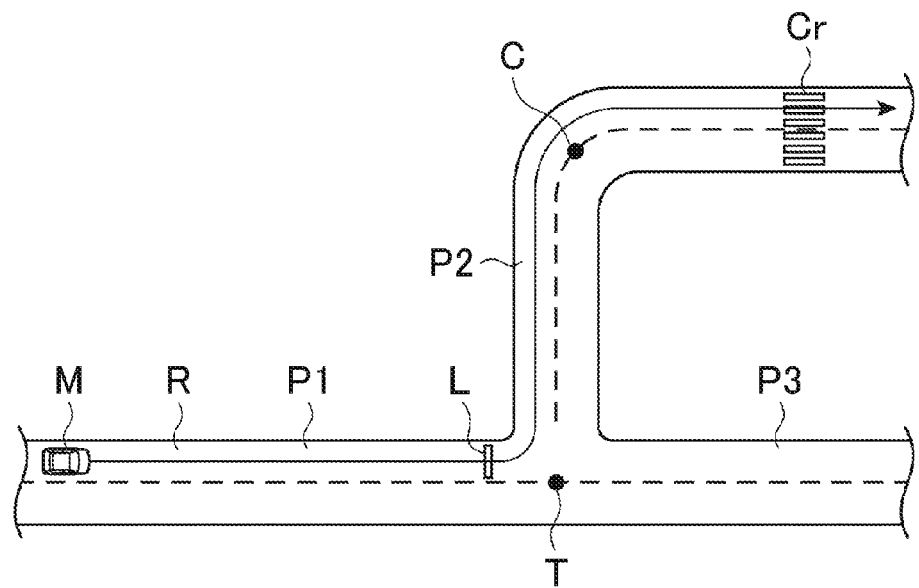
FIG. 2A is a plan view showing a situation in which a vehicle is controlled to travel along a route.

Here, FIG. 2A is a plan view showing a situation in which the vehicle M is controlled to travel along a route. FIG. 2A shows a route R along which the vehicle M travels, lanes P1, P2 forming the route R, an intersection T constituted by a T junction connecting the lane P1 to the lane P2, a lane P3 connected to the lanes P1, P2 via the intersection T, a temporary stop line L positioned in front of the intersection T on the lane P1, a curve C forming the lane P2, and a pedestrian crossing Cr depicted by white lines on the lane P2. The intersection T forms a part of the lane P1. In FIG. 2A, the vehicle M travels straight along the lane P1, stops temporarily at the temporary stop line L, and then turns left at the intersection T so as to enter the lane P2. The vehicle M then advances along the lane P2, travels around the curve C, and advances over the pedestrian crossing Cr.

In the situation shown in FIG. 2A, the vehicle control apparatus 1 stores the intersection T and the curve C as steering modification points. Here, the current position of the vehicle M in FIG. 2A serves as the lane entrance position to the lane P1. In this case, the vehicle control apparatus 1 stores the intersection T located at a lane travel distance of 100.0 m on the lane P1, for example. The intersection T serving as the steering modification point also includes information relating to the steering modification. The information relating to the steering modification includes a curvature radius r and an angle α of a left turn (an angle from a start point to an end point of an arc drawn by a locus during the left turn), for example. It is assumed here that the curvature radius r and the angle α of the left turn performed at the intersection T are 5.5 m and 90°, respectively. When the lane travel distance is expressed as offset, the information relating to the intersection T may be expressed as (left turn/right turn classification, offset, r, α): (left turn, 100.0, 5.5, 90). The vehicle control apparatus 1 stores the information relating to the intersection T serving as the steering modification point in association with the lane P1 in the form of (left turn, 100.0, 5.5, 90). Note that when the route R passes straight through the intersection T, the vehicle control apparatus 1 does not use the intersection T as a steering modification point.

Figure 2B:
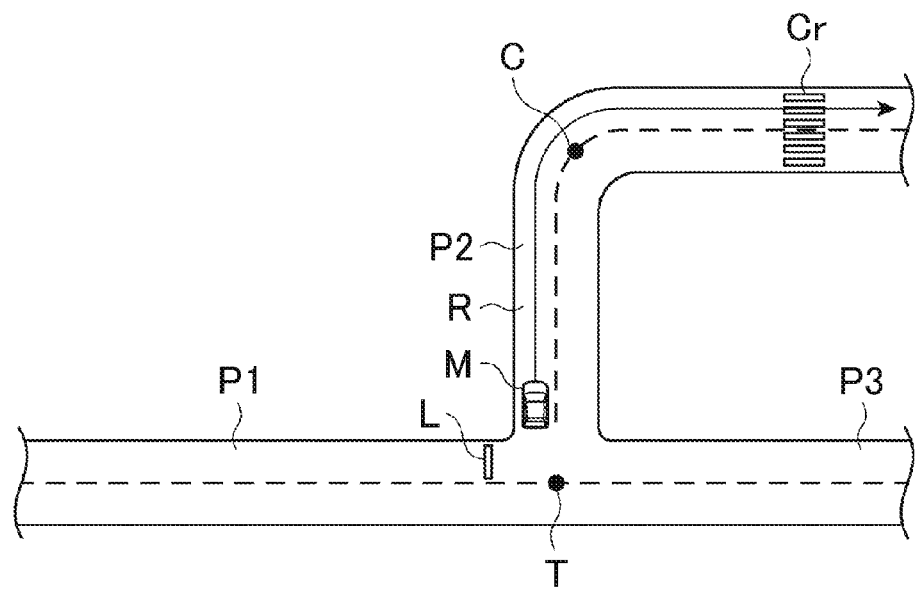
FIG. 2B is a plan view showing a situation in which the vehicle enters the next lane.

FIG. 2B is a plan view showing a situation in which the vehicle M enters the next lane P2. The position of the vehicle M in FIG. 2B serves as the lane entrance position to the lane P2. The vehicle control apparatus 1 stores the curve C located at a lane travel distance of 50.0 m on the lane P2, for example. The curve C is a rightward curve. Assuming that the curvature radius r and the angle α of the curve C are 5.0 m and 90°, respectively, information relating to the curve C may be expressed as (rightward/leftward classification, offset, r, α)=(rightward, 50.0, 5.0, 90). The vehicle control apparatus 1 stores the information relating to the curve C serving as the steering modification point in association with the lane P2 in the form of (rightward, 50.0, 5.0, 90), for example.

Further, in FIG. 2A, the vehicle control apparatus 1 stores the temporary stop line L and the pedestrian crossing Cr as vehicle speed target points. For example, the vehicle control apparatus 1 stores the temporary stop line L located at a lane travel distance of 99.5 m on the lane P1. The target vehicle speed at the temporary stop line L is 0 km/h, and therefore information relating to the temporary stop line L may be expressed as (offset, target vehicle speed)=(99.5, 0). The vehicle control apparatus 1 stores the information relating to the temporary stop line L serving as the vehicle speed target point in association with the lane P1 in the form of (99.5, 0), for example.

Similarly, the vehicle control apparatus 1 stores the pedestrian crossing Cr located at a lane travel distance of 110.0 m on the lane P2, for example. Assuming that the target vehicle speed at the pedestrian crossing Cr is 10 km/h, for example, information relating to the pedestrian crossing Cr may be expressed as (offset, target vehicle speed)=(110.0, 10). The vehicle control apparatus 1 stores the information relating to the pedestrian crossing Cr serving as the vehicle speed target point in association with the lane P2 in the form of (110.0, 10), for example.

When setting a route along which the vehicle M is to travel, the vehicle control apparatus 1 generates lane travel map data for use while the vehicle M travels on the basis of the map information, the steering modification points, and the vehicle speed target points. The lane travel map data include information indicating target positions, information indicating target orientations, and information indicating target vehicle speeds to be applied to the vehicle M as the vehicle M travels along the route. The lane travel map data are generated for each lane. The lane travel map data are generated using the lane travel distance that is the distance traveled by the vehicle M along a lane from the lane entrance position, as a reference.

The lane travel map data include a waypoint map, a landmark map, and a control target map, for example. The waypoint map is a data array relating to the target positions and target orientations of the vehicle M while traveling along the route. On the waypoint map, target positions and target orientations are set at fixed distance intervals (every 2 cm, for example) along the route. A location associated with a target position and a target orientation in the map information is called as a waypoint. The waypoint map is a data array in which waypoints are set at fixed distance intervals using the lane travel distance on each lane as a reference.

The target positions on the waypoint map include, in addition to the lane travel distance, position information using an xy coordinate system on a map. The xy coordinate system may use the lane entrance position of each lane as a reference (an origin), for example. In this case, an x direction corresponds to the advancement direction of the vehicle M in the lane entrance position, while a y direction corresponds to the width direction of the vehicle M in the lane entrance position. When the lane is rectilinear, the x coordinate matches the lane travel distance. When the lane is curved, the x coordinate does not match the lane travel distance. The target position includes (offset, x, y,). Further, the target orientations on the waypoint map are expressed as angles θ using the advancement direction of the vehicle M in the lane entrance position as a reference.

The waypoint map also includes information relating to a curve flag, which is a flag used to recognize that the vehicle M is positioned in front of or on a curve, for example. The curve flag is set at each waypoint. In this case, the curve also includes the intersection at which a right or left turn is required on the route. The curve flag is set at 1 from 5 m in front of the curve until the vehicle M passes the curve, for example, and set at 0 at all other times. The vehicle control apparatus 1 generates the waypoint map including the curve flag on the basis of the steering modification points. Note that the curve flag does not necessarily have to be set on the waypoint map.

The vehicle control apparatus 1 generates the waypoint map on the assumption that the lanes constituting the route are rectilinear in locations other than at the steering modification points. In other words, in locations other than the steering modification points, the waypoint map is constituted by continuous waypoints forming a straight line along the lane.

The vehicle control apparatus 1 generates the waypoint map so that the vehicle M performs steering modifications (curves, left/right turns, and so on) at the steering modification points. More specifically, the vehicle control apparatus 1 uses the curvature radius r of the curve C serving as the steering modification point to calculate an arc-shaped locus having the curvature radius r. Further, the vehicle control apparatus 1 determines an end point of the arc-shaped locus from the angle α of the curve C serving as the steering modification point. Note that the start point of the curve C is determined from the position information of the curve C (i.e. the lane travel distance), for example. The vehicle control apparatus 1 generates the waypoint map so as to include a data array of target positions and target orientations enabling the vehicle M to travel along the calculated arc-shaped locus, for example.

The vehicle control apparatus 1 generates the waypoint map dynamically while the vehicle M travels using the route of the vehicle M, the current location of the vehicle M, and the steering modification points. The vehicle control apparatus 1 generates the waypoint map so as to extend from the current location of the vehicle M on the route to a location three steering modification points ahead. When the vehicle M passes a steering modification point, for example, the vehicle control apparatus 1 updates the waypoint map by generating a new waypoint map extending from the current location to a location three steering modification points ahead. Note that the vehicle control apparatus 1 may update the waypoint map every time the vehicle M travels a certain advancement distance (200.0 m, for example) along the lane rather than every time the vehicle M passes a steering modification point.

The landmark map is a data array relating to landmark targets used to correct the position of the vehicle M. The landmark targets are detection subjects located in fixed positions relative to the lane. The landmark targets include temporary stop lines L, pedestrian crossings Cr, alphabetic characters or numerals, diamond marks, and other road markings drawn on the lane in white lines, for example. The landmark targets also include roadside structures such as guardrails. When a landmark target is detected by a camera, for example, the vehicle control apparatus 1 corrects the position of the vehicle M on the basis of a distance between the landmark target and the vehicle M using the position of the landmark target in the map information as a reference. Note that the vehicle control apparatus 1 does not necessarily have to perform position correction, and therefore the landmark map is not essential.

The control target map is a data array relating to the target vehicle speed of the vehicle M traveling along the route. The control target map is a data array in which the vehicle speed target points on each lane are arranged in accordance with the lane travel distance, for example. The vehicle control apparatus 1 generates the control target map by arranging in sequence the vehicle speed target points included in a range extending from the current location of the vehicle M on the route to a location three steering modification points ahead on the basis of the lane travel distances of the vehicle speed target points on each lane, for example.

The vehicle control apparatus 1 enables the vehicle M to travel along the route by controlling the vehicle M on the basis of the generated lane travel map data. The vehicle control apparatus 1 controls steering of the vehicle M on the basis of the waypoint map. The vehicle control apparatus 1 controls the vehicle speed of the vehicle M on the basis of the waypoint map and the control target map.

A configuration of the vehicle control apparatus 1 according to this embodiment will be described below with reference to the drawings. As shown in FIG. 1, the vehicle control apparatus 1 includes an electronic control unit [ECU] 2 that performs overall control of the apparatus. The ECU 2 is an electronic control unit constituted by a central processing unit [CPU], a read-only memory [ROM], a random access memory [RAM], and so on. The ECU 2 may be constituted by a plurality of electronic control units. The ECU 2 is connected to an external sensor 3, an internal sensor 4, a GPS reception unit 5, the map related information provision unit 6, and an actuator 7.

The external sensor 3 is an in-vehicle detection device that detects external conditions serving as peripheral information of the vehicle M. The external sensor 3 includes a camera 8 and a radar 9.

The camera 8 is provided on a rear side of a windshield of the vehicle M and a rear surface of the vehicle M. The camera 8 transmits image information relating to the front and rear of the vehicle M to the ECU 2. The camera 8 may be a monocular camera or a stereo camera. A stereo camera includes two imaging units disposed so as to reproduce binocular disparity. Image information captured by a stereo camera also includes disparity information (distance information).

The radar 9 detects obstructions on the exterior of the vehicle M using radio waves (millimeter waves, for example). The radar detects an obstruction (another vehicle, a pedestrian, a bicycle, a structure, or the like) by transmitting radio waves to the periphery of the vehicle M and receiving radio waves reflected by the obstruction. The radar 9 transmits information indicating the detected obstruction to the ECU 2. Note that light detection and ranging [LIDAR] employing light may be used instead of the radar 9. Further, it is not necessary to provide both the camera 8 and the radar 9, and only one thereof may be provided.

The internal sensor 4 is a detection device that detects travel conditions of the vehicle M. The internal sensor 4 includes a vehicle speed sensor. The vehicle speed sensor is a detector that detects the speed of the vehicle M. A vehicle wheel speed sensor provided on a vehicle wheel of the vehicle M or a drive shaft or the like that rotates integrally with the vehicle wheel in order to detect a rotation speed of the vehicle wheel, for example, is used as the vehicle speed sensor. The vehicle speed sensor transmits information indicating the detected vehicle speed to the ECU 2.

The internal sensor 4 includes an acceleration sensor and a yaw rate sensor. The acceleration sensor is a detector that detects an acceleration of the vehicle M. The acceleration sensor includes, for example, a front-rear acceleration sensor that detects acceleration in a front-rear direction of the vehicle M, and a lateral acceleration sensor that detects a lateral acceleration of the vehicle M. The acceleration sensor transmits information indicating the acceleration of the vehicle M to the ECU 2, for example. The yaw rate sensor is a detector that detects a yaw rate (a rotation angular velocity) of a center of gravity of the vehicle M about a vertical axis. A gyro sensor, for example, may be used as the yaw rate sensor. The yaw rate sensor transmits information indicating the detected yaw rate of the vehicle M to the ECU 2.

The GPS reception unit 5 measures the position of the vehicle M (the latitude and longitude of the vehicle M, for example) by receiving signals from three or more GPS satellites. RTK-GPS technology, for example, is employed in the GPS reception unit 5. As a result, the precision with which the GPS reception unit 5 measures the position of the vehicle M can be increased. The GPS reception unit 5 transmits information indicating the measured position of the vehicle M to the ECU 2.

The map related information provision unit 6 is an information provision system installed in the vehicle M. The map related information provision unit 6 transmits data relating to the map information, the steering modification points, and the vehicle speed target points to the ECU 2 in response to a request from the ECU 2. The map related information provision unit 6 includes a map information storage unit 10, a point information storage unit 11, and a target storage unit 12.

The map information storage unit 10 is a database for storing the map information. The map information storage unit 10 is constructed in a storage medium (a hard disk drive [HDD], for example) installed in the vehicle. The point information storage unit 11 is a database for storing the steering modification points and vehicle speed target points associated with the map information. The point information storage unit 11 may be constructed in the same storage medium as the map information storage unit 10 or in a different storage medium.

The target storage unit 12 is a database for storing target information relating to the landmark targets. The target information includes information indicating the positions of the landmark targets (information indicating the lane travel distance on the corresponding lane, for example) and information indicating detection characteristics of the landmark targets. The information indicating the detection characteristics of the landmark targets is information used by the camera 8 or the radar 9 to detect the landmark targets. The detection characteristic information may be shape information used by the camera 8 to detect the landmark targets, reflection characteristic information used by the radar 9 to detect the landmark targets, and so on, for example. Other available information may also be used as the detection characteristic information. The target storage unit 12 may likewise be constructed in the same storage medium as the map information storage unit 10 or in a different storage medium. Note that when position correction is not performed, the map related information provision unit 6 does not have to include the target storage unit 12.

The map related information provision unit 6 may have a function for performing wireless communication with a computer provided in an external facility such as an information management center. In this case, the map related information provision unit 6 can update the map information, steering modification points, and vehicle speed target points by performing wireless communication as required.

The actuator 7 is an apparatus that controls travel by the vehicle M. The actuator 7 includes at least a throttle actuator, a brake actuator, and a steering actuator. The throttle actuator controls a driving force of the vehicle M by controlling an amount of air supplied to an engine (a throttle opening) in response to a control signal from the ECU 2. Note that when the vehicle M is a hybrid vehicle or an electric vehicle, the throttle actuator is not included, and the driving force is controlled by inputting a control signal from the ECU 2 into a motor serving as a power supply.

The brake actuator controls a braking force exerted on the vehicle wheels of the vehicle M by controlling a brake system in response to a control signal from the ECU 2. A hydraulic brake system, for example, may be used as the brake system. The steering actuator controls driving of an assist motor, which is provided an electric power steering system in order to control a steering torque, in response to a control signal from the ECU 2. In so doing, the steering actuator controls the steering torque of the vehicle M.

Next, a functional configuration of the ECU 2 will be described. Note that some of the functions of the ECU 2 may be executed by a computer that is provided in a facility such as an information management center so as to be capable of communicating with the vehicle M, or by a portable information terminal capable of communicating with the vehicle M. A portable information terminal taken into a vehicle cabin corresponds to a device installed in the vehicle. The ECU 2 includes a position detection unit 20, a target detection unit 21, a target distance detection unit 22, a position correction unit 23, an advancement direction detection unit 24, a lane travel distance calculation unit 25, a data generation unit 26, a forward gaze point calculation unit 27, and a vehicle control unit 28.

The position detection unit 20 detects the position (xy coordinates) of the vehicle M. The position detection unit 20 detects the position of the vehicle M on the corresponding lane using a conventional method on the basis of the information indicating the position of the vehicle M, measured by the GPS reception unit 5, for example. The position detection unit 20 may detect the position (the lane travel distance, for example) of the vehicle M on the basis of the vehicle speed information from the vehicle speed sensor of the vehicle M. Further, the position detection unit 20 may detect a lateral position (a position in the width direction of the lane) of the vehicle M by recognizing a white line along which the vehicle M travels on the basis of the image information captured by the camera 8. Furthermore, the position detection unit 20 may correct the position of the vehicle M by a conventional method using the waypoint that is closest to the vehicle M as the vehicle M travels.

The target detection unit 21 detects landmark targets to the front and rear of the vehicle M on the basis of the detection result of the external sensor 3 and the target information from the map related information provision unit 6. In other words, the target detection unit 21 detects landmark targets from the image information captured by the camera 8 and the obstruction information from the radar 9 by referring to the target information in the target storage unit 12.

When the target detection unit 21 detects a landmark target, the target distance detection unit 22 detects a distance between the landmark target and the vehicle M. The target distance detection unit 22 detects the distance between the landmark target and the vehicle M on the basis of the obstruction information from the radar 9, for example. When the camera 8 is a stereo camera, for example, the target distance detection unit 22 may detect the distance between the landmark target and the vehicle M on the basis of information (depth distance information) indicating the disparity on the image captured by the stereo camera.

When the target distance detection unit 22 detects the distance between the landmark target and the vehicle M, the position correction unit 23 corrects the position of the vehicle M, detected by the position detection unit 20, on the basis of the distance between the landmark target and the vehicle M. The position correction unit 23 corrects the position of the vehicle M using a conventional method on the basis of the distance between the landmark target and the vehicle M. The position correction unit 23 also corrects the lane travel distance calculated by the lane travel distance calculation unit 25, to be described below, on the basis of the distance between the landmark target and the vehicle M. Note that position correction does not have to be performed by the position correction unit 23. In this case, the target detection unit 21 and the target distance detection unit 22 are also not required.

The advancement direction detection unit 24 detects the advancement direction of the vehicle M on the basis of the yaw rate information from the yaw rate sensor of the internal sensor 4. Alternatively, the advancement direction detection unit 24 may detect the advancement direction of the vehicle M on the basis of temporal variation in the information indicating the position of the vehicle M, detected by the position detection unit 20.

The lane travel distance calculation unit 25 calculates a first lane travel distance candidate, which is a candidate of the lane travel distance of the vehicle M on the lane in which the vehicle M is currently traveling, on the basis of the information indicating the position of the vehicle M, detected by the position detection unit 20. Further, the lane travel distance calculation unit 25 calculates a second lane travel distance candidate as a candidate of the lane travel distance on the basis of the vehicle speed information obtained by the vehicle speed sensor from the lane entrance position to the current location on the lane in which the vehicle M is currently traveling.

The lane travel distance calculation unit 25 determines whether or not a difference between the first lane travel distance candidate and the second lane travel distance candidate equals or exceeds an allowable threshold. The allowable threshold is a threshold set in advance to determine whether or not an error in the lane travel distance is within an allowable range. When the difference between the first lane travel distance candidate and the second lane travel distance candidate is determined not to equal or exceed the allowable threshold, the lane travel distance calculation unit 25 calculates the first lane travel distance candidate as the lane travel distance. When the difference between the first lane travel distance candidate and the second lane travel distance candidate is determined to equal or exceed the allowable threshold, the lane travel distance calculation unit 25 calculates the second lane travel distance candidate as the lane travel distance.

The data generation unit 26 generates the lane travel map data described above. The data generation unit 26 includes a waypoint map generation unit 30, a landmark map generation unit 31, and a control target map generation unit 32.

The waypoint map generation unit 30 generates the waypoint map from the steering modification points in the point information storage unit 11 on the basis of the route of the vehicle M and the position (the current location) of the vehicle M. For example, the waypoint map generation unit 30 generates a waypoint map extending from the current location of the vehicle M on the route to a location three steering modification points ahead. After determining, on the basis of the information indicating the position of the vehicle M, detected by the position detection unit 20, for example, that the vehicle M has passed a steering modification point, the waypoint map generation unit 30 generates a new waypoint map extending from the current location of the vehicle M on the route to a location three steering modification points ahead. The waypoint map generation unit 30 stores the waypoint map currently being generated in a first data buffer, for example. The first data buffer may be a RAM or an HDD, for example. Once generation of the new waypoint map is complete, the waypoint map generation unit 30 updates the used waypoint map.

The landmark map generation unit 31 generates the landmark map relating to the landmark targets from the target information in the target storage unit 12 on the basis of the route of the vehicle M and the position (the current location) of the vehicle M. For example, the landmark map generation unit 31 obtains the target information in relation to landmark targets on the route from the current location of the vehicle M to a location three steering modification points ahead. The landmark map generation unit 31 generates the landmark map as a data array of landmark targets by arranging the landmark targets in order of advancement along the route on the basis of the lane travel distances of the landmark targets on each lane.

The control target map generation unit 32 generates the control target map from the vehicle speed target points in the point information storage unit 11 on the basis of the route of the vehicle M and the position of the vehicle M. For example, the control target map generation unit 32 obtains vehicle speed target points on the route from the current location of the vehicle M to a location three steering modification points ahead. The control target map generation unit 32 generates the control target map as a data array of vehicle speed target points by arranging the vehicle speed target points in order of advancement along the route on the basis of the lane travel distances of the vehicle speed target points on each lane.

The forward gaze point calculation unit 27 calculates a forward gaze point of the vehicle M. The forward gaze point is a location set in front of the vehicle M. The forward gaze point is set by envisaging a location on which the gaze of the driver would be fixed if the driver were driving the vehicle M manually, for example. The forward gaze point calculation unit 27 sets the forward gaze point on the basis of the vehicle speed information from the vehicle speed sensor. The forward gaze point calculation unit 27 sets the forward gaze point in a position steadily further ahead of the vehicle M as the vehicle speed of the vehicle M increases. When the vehicle speed of the vehicle M is 0 km/h, the forward gaze point calculation unit 27 sets a distance between the forward gaze point and the vehicle M at a preset minimum distance (5 m, for example).

Further, the forward gaze point calculation unit 27 may set the forward gaze point using a forward gaze time, for example. The forward gaze point calculation unit 27 recognizes the closest waypoint to the vehicle M in front of the vehicle M on the basis of the lane travel distance of the vehicle M. The forward gaze point calculation unit 27 then sets the forward gaze time on the basis of the curve flag at the recognized waypoint. When the curve flag at the waypoint closest to the vehicle M is at 1 (when the vehicle M is positioned in front of or on a curve), the forward gaze point calculation unit 27 sets the forward gaze time at a long time required for a curve (1.2 seconds, for example). When the curve flag at the waypoint closest to the vehicle M is at 0 (when the vehicle M is not positioned in front of or on a curve), the forward gaze point calculation unit 27 sets the forward gaze time at a normal time (0.7 seconds, for example). The forward gaze point calculation unit 27 calculates a point located ahead of the vehicle M by a distance obtained by multiplying the forward gaze time by the vehicle speed, for example, as the forward gaze point. Note that the ECU 2 does not necessarily have to include the forward gaze point calculation unit 27.

The vehicle control unit 28 controls the vehicle M to travel along the route on the basis of the lane travel map data (the waypoint map, the landmark map, and the control target map) generated by the data generation unit 26. The vehicle control unit 28 controls the vehicle M by transmitting control signals to the actuator 7.

The vehicle control unit 28 performs steering control on the vehicle M on the basis of the position of the vehicle M, the lane travel distance of the vehicle M, the waypoint map, and the forward gaze point, for example. The vehicle control unit 28 recognizes a waypoint in front of the vehicle M on the basis of the position of the vehicle M and the lane travel distance of the vehicle M. For example, the vehicle control unit 28 controls steering of the vehicle M on the basis of a lateral direction (lane width direction) deviation between the forward gaze point set in front of the vehicle M and the closest waypoint to the forward gaze point in order to reduce the deviation. Note that the vehicle control unit 28 does not necessarily have to perform steering control using the forward gaze point. The vehicle control unit 28 may perform steering control on the vehicle M by a combination of conventional methods using the lane travel distance of the vehicle M and the waypoint map.

The vehicle control unit 28 performs vehicle speed control on the vehicle on the basis of the position of the vehicle M, the lane travel distance of the vehicle M, the waypoint map, and the control target map, for example. The vehicle control unit 28 sets an acceleration target vehicle speed of the vehicle M on the basis of the curve flag at the closest waypoint to the vehicle M in front of the vehicle M. The acceleration target vehicle speed is a vehicle speed used as a vehicle speed adjustment target when there are no nearby vehicle speed target points. For example, when the curve flag at the closest waypoint to the vehicle M is at 1, the vehicle control unit 28 sets the acceleration target vehicle speed at crawl speed. The acceleration target vehicle speed may be set within a range of 10 km/h to 40 km/h, for example.

When the curve flag at the closest waypoint to the vehicle M is at 0, the vehicle control unit 28 determines whether or not white line recognition has been performed on the basis of the image information from the camera 8 after passing through the immediately preceding steering modification point. Having determined that white line recognition has not been performed, the vehicle control unit 28 sets the acceleration target vehicle speed at crawl speed or a low vehicle speed. Having determined that white line recognition has been performed, the vehicle control unit 28 determines whether or not a difference in the lane travel distance (offset) between the immediately preceding steering modification point and the next steering modification point equals or exceeds a difference threshold. The difference threshold is a preset threshold for determining whether or not the distance is large enough for the vehicle M to accelerate sufficiently, for example.

Having determined that the difference equals or exceeds the difference threshold, the vehicle control unit 28 sets the acceleration target vehicle speed at an upper limit speed. The upper limit speed is an upper limit of the vehicle speed allowed by the vehicle control apparatus 1, for example. The upper limit speed may be the legal maximum speed on the lane. Having determined that the difference does not equal or exceed the difference threshold, the vehicle control unit 28 sets the acceleration target vehicle speed at an intermediate speed. The intermediate speed is an intermediate speed between the upper limit speed and crawl speed. The intermediate speed may be set within a range of 40 km/h to 60 km/h.

The vehicle control unit 28 performs vehicle speed control on the vehicle M so that the vehicle speed of the vehicle M approaches the acceleration target vehicle speed. However, the vehicle control unit 28 prioritizes the target vehicle speed at the vehicle speed target point over the acceleration target vehicle speed. The vehicle control unit 28 determines whether or not the distance on the route between the vehicle M and the next vehicle speed target point is no greater than a distance threshold. Having determined that the distance is no greater than the distance threshold, the vehicle control unit 28 calculates a required deceleration distance required for the vehicle M to reach the target vehicle speed at a preset deceleration on the basis of the current vehicle speed and the target vehicle speed at the vehicle speed target point. Note that when the current vehicle speed of the vehicle M is at or below the target vehicle speed, the required deceleration distance is 0.

The vehicle control unit 28 determines whether or not the distance on the route between the vehicle M and the next vehicle speed target point is greater than the required deceleration distance. Having determined that the distance is greater than the required deceleration distance, the vehicle control unit 28 determines whether or not a difference between the current vehicle speed and the acceleration target vehicle speed is no greater than an acceleration threshold. The acceleration threshold is a preset threshold for determining that adjustment of the vehicle speed to the target vehicle speed at the vehicle speed target point will not be affected greatly by accelerating the vehicle M to the acceleration target vehicle speed, for example. Having determined that the difference is greater than the acceleration threshold, the vehicle control unit 28 accelerates the vehicle M to the acceleration target vehicle speed at a fixed acceleration. Having determined that the difference is not greater than the acceleration threshold, the vehicle control unit 28 maintains the current vehicle speed.

When the distance on the route between the vehicle M and the next vehicle speed target point is not greater than the required deceleration distance, on the other hand, the vehicle control unit 28 determines whether or not the target vehicle speed at the next vehicle speed target point is 0 km/h. Having determined that the target vehicle speed at the next vehicle speed target point is 0 km/h, the vehicle control unit 28 performs temporary stop processing, in which the vehicle speed is controlled such that the vehicle M stops temporarily at the vehicle speed target point. When the vehicle M stops temporarily at the vehicle speed target point, the vehicle control unit 28 causes the vehicle M to travel slowly over the vehicle speed target point. Having determined that the target vehicle speed at the next vehicle speed target point is not 0 km/h, the vehicle control unit 28 adjusts the vehicle speed of the vehicle M to the target vehicle speed of the vehicle speed target point. Additionally, the vehicle control unit 28 may control the vehicle speed of the vehicle M using a combination of conventional methods on the basis of the lane travel distance of the vehicle M, the waypoint map, and the control target map.

Figure 3:
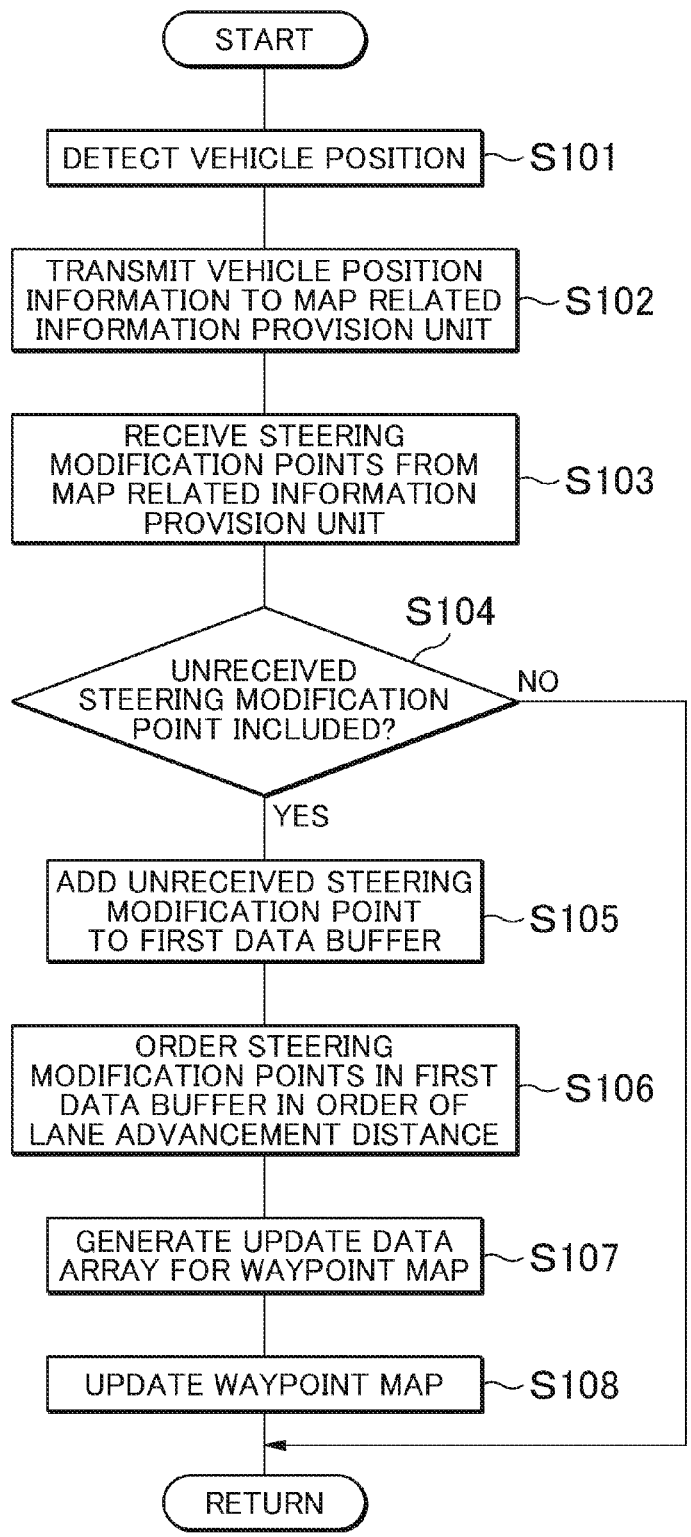
FIG. 3 is a flowchart showing waypoint map update processing executed by the vehicle control apparatus.

Waypoint map update processing executed by the vehicle control apparatus 1 according to this embodiment will be described below. FIG. 3 is a flowchart showing the waypoint map update processing executed by the vehicle control apparatus 1. The flowchart shown in FIG. 3 is executed when the vehicle M satisfies a predetermined update condition, for example. The predetermined update condition is satisfied when the vehicle M passes a steering modification point, for example.

As shown in FIG. 3, in S101, the ECU 2 of the vehicle control apparatus 1 detects the position of the vehicle M using the position detection unit 20. The position detection unit 20 detects the position of the vehicle M on the basis of the position information from the GPS reception unit 5, for example.

In S102, the ECU 2 transmits information indicating the position of the vehicle M to the map related information provision unit 6. The map related information provision unit 6 extracts the next three steering modification points on the route ahead of the current location of the vehicle M from the point information storage unit 11 on the basis of the information indicating the position of the vehicle M, transmitted from the ECU 2, for example. The map related information provision unit 6 transmits information indicating the next three steering modification points ahead of the current location of the vehicle M to the ECU 2. Note that information regarding the route of the vehicle M is transmitted to the map related information provision unit 6 from the ECU 2 when the route is set, for example. In S103, the ECU 2 receives the information indicating the next three steering modification points ahead of the current location of the vehicle M from the map related information provision unit 6.

In S104, the ECU 2 determines whether or not the steering modification points transmitted from the map related information provision unit 6 include a steering modification point that has not yet been received by the waypoint map generation unit 30. When the ECU 2 determines that the steering modification points do not include an unreceived steering modification point (S104: NO), the current update processing is terminated. The ECU 2 then repeats the processing from S101 when the update condition is again satisfied. When the ECU 2 determines that the steering modification points include an unreceived steering modification point (S104: YES), the routine advances to S105.

In S105, the ECU 2 adds the unreceived steering modification point to the first data buffer using the waypoint map generation unit 30. The first data buffer may be the RAM of the ECU 2 or an HDD. This applies likewise to data buffers described below. In S106, the ECU 2 uses the waypoint map generation unit 30 to order the steering modification points in the first data buffer in order of the lane travel distance.

In S107, the ECU 2 generates a waypoint map update data array using the waypoint map generation unit 30. The waypoint map generation unit 30 generates the update data array on the basis of the ordered steering modification points. The waypoint map generation unit 30 generates the update data array on the assumption that the lanes forming the route are rectilinear in locations other than at the steering modification points. The waypoint map generation unit 30 generates a data array enabling the vehicle M to perform steering modifications at the steering modification points on the basis of the lane travel distances, left turn/right turn classifications, curvature radius r, and angles α of the steering modification points. After completing the update data array, the ECU 2 updates the data array of the waypoint map in S108 using the waypoint map generation unit 30. The ECU 2 then repeats the processing from S101 when the update condition is again satisfied.

Figure 4:
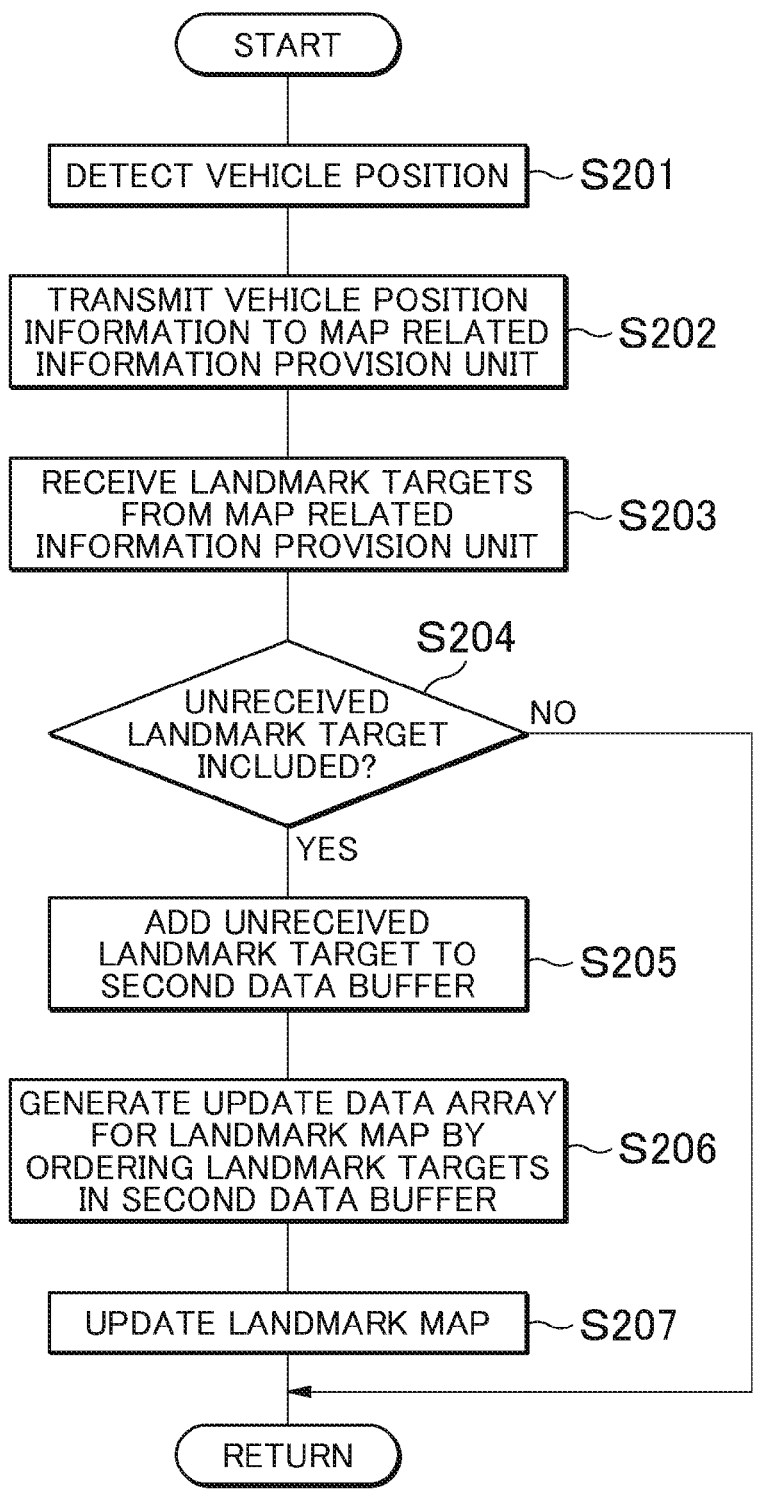
FIG. 4 is a flowchart showing landmark map update processing executed by the vehicle control apparatus.

Next, landmark map update processing executed by the vehicle control apparatus 1 according to this embodiment will be described. FIG. 4 is a flowchart showing the landmark map update processing executed by the vehicle control apparatus 1. The flowchart shown in FIG. 4 is executed when the vehicle M satisfies a predetermined update condition, for example. The predetermined update condition is satisfied when the vehicle M passes a steering modification point, for example.

As shown in FIG. 4, in S201, the ECU 2 of the vehicle control apparatus 1 detects the position of the vehicle M using the position detection unit 20. The position detection unit 20 detects the position of the vehicle M on the basis of the position information from the GPS reception unit 5, for example.

In S202, the ECU 2 transmits information indicating the position of the vehicle M to the map related information provision unit 6. The map related information provision unit 6 extracts target information relating to the landmark targets on the route from the target storage unit 12 on the basis of the information indicating the position of the vehicle M, transmitted from the ECU 2, for example. The map related information provision unit 6 extracts target information relating to the landmark targets included on the route up to the next three steering modification points from the current location of the vehicle M, for example. The map related information provision unit 6 transmits the extracted target information to the ECU 2. In S203, the ECU 2 receives the target information from the map related information provision unit 6.

In S204, the ECU 2 determines whether or not the landmark targets transmitted from the map related information provision unit 6 include a landmark target that has not yet been received by the landmark map generation unit 31. When the ECU 2 determines that the landmark targets do not include an unreceived landmark target (S204: NO), the current update processing is terminated. The ECU 2 then repeats the processing from S201 when the update condition is again satisfied. When the ECU 2 determines that the landmark targets include an unreceived landmark target (S204: YES), the routine advances to S205.

In S205, the ECU 2 adds the unreceived landmark target to a second data buffer using the landmark map generation unit 31. In S206, the ECU 2 uses the landmark map generation unit 31 to generate an update data array by ordering the landmark targets in the second data buffer in order of the lane travel distance. After completing the update data array, the ECU 2 updates the data array of the landmark map in S207 using the landmark map generation unit 31. The ECU 2 then repeats the processing from S201 when the update condition is again satisfied.

Figure 5:
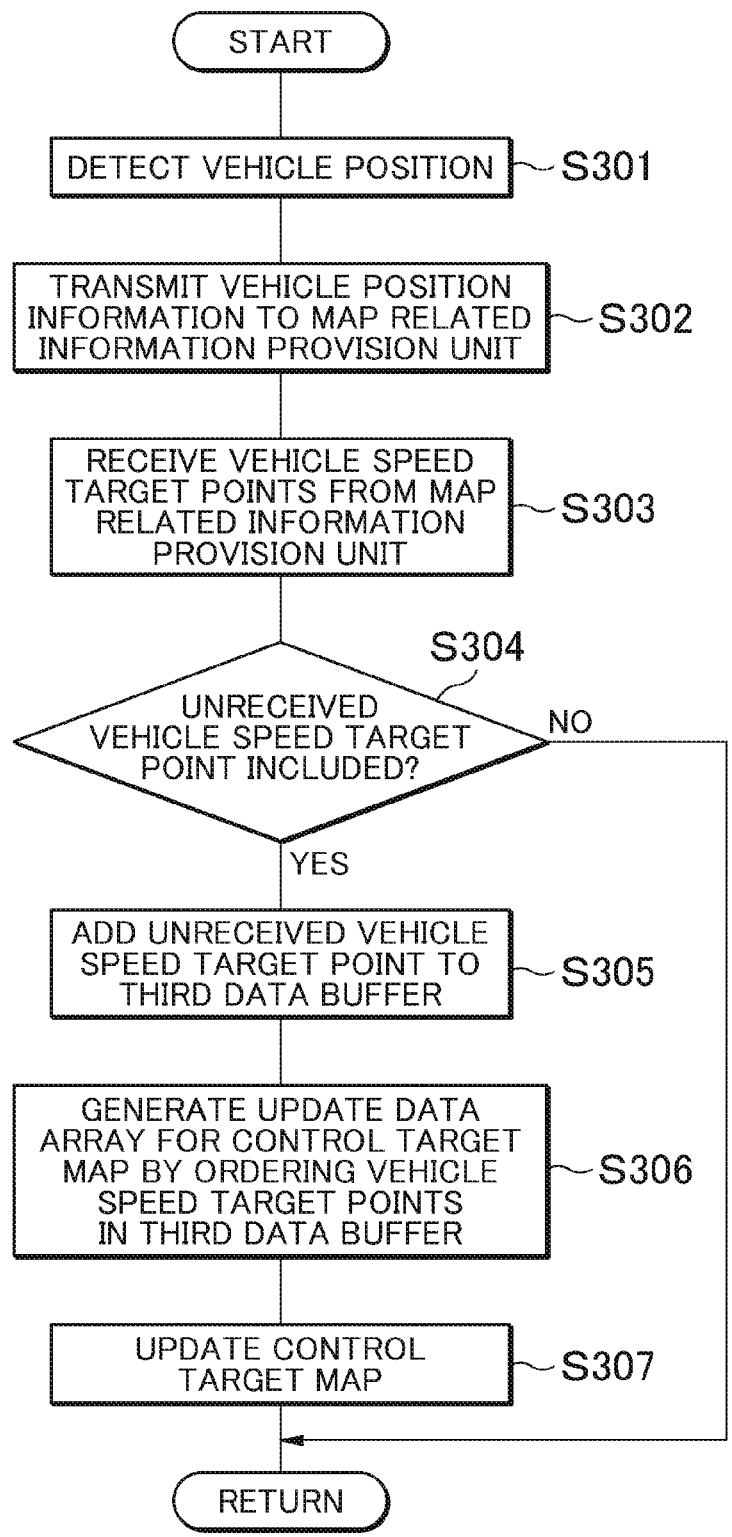
FIG. 5 is a flowchart showing control target map update processing executed by the vehicle control apparatus.

Next, control target map update processing executed by the vehicle control apparatus 1 according to this embodiment will be described. FIG. 5 is a flowchart showing the control target map update processing executed by the vehicle control apparatus 1. The flowchart shown in FIG. 5 is executed when the vehicle M satisfies a predetermined update condition, for example. The predetermined update condition is satisfied when the vehicle M passes a steering modification point, for example.

As shown in FIG. 5, in S301, the ECU 2 of the vehicle control apparatus 1 detects the position of the vehicle M using the position detection unit 20. The position detection unit 20 detects the position of the vehicle M on the basis of the position information from the GPS reception unit 5, for example.

In S302, the ECU 2 transmits information indicating the position of the vehicle M to the map related information provision unit 6. The map related information provision unit 6 extracts vehicle speed target points on the route from the point information storage unit 11 on the basis of the information indicating the position of the vehicle M, transmitted from the ECU 2, for example. The map related information provision unit 6 extracts the vehicle speed target points included on the route up to the next three steering modification points from the current location of the vehicle M, for example. The map related information provision unit 6 transmits the extracted vehicle speed target points to the ECU 2. In S303, the ECU 2 receives the vehicle speed target points from the map related information provision unit 6.

In S304, the ECU 2 determines whether or not the vehicle speed target points transmitted from the map related information provision unit 6 include a vehicle speed target point that has not yet been received by the control target map generation unit 32. When the ECU 2 determines that the vehicle speed target points do not include an unreceived vehicle speed target point (S304: NO), the current update processing is terminated. The ECU 2 then repeats the processing from S301 when the update condition is again satisfied. When the ECU 2 determines that the vehicle speed target points include an unreceived vehicle speed target point (S304: YES), the routine advances to S305.

In S305, the ECU 2 adds the unreceived vehicle speed target point to a third data buffer using the control target map generation unit 32. In S306, the ECU 2 uses the control target map generation unit 32 to generate an update data array by ordering the vehicle speed target points in the third data buffer in order of the lane travel distance. After completing the update data array, the ECU 2 updates the data array of the control target map in S307 using the control target map generation unit 32. The ECU 2 then repeats the processing from S301 when the update condition is again satisfied.

Figure 6:
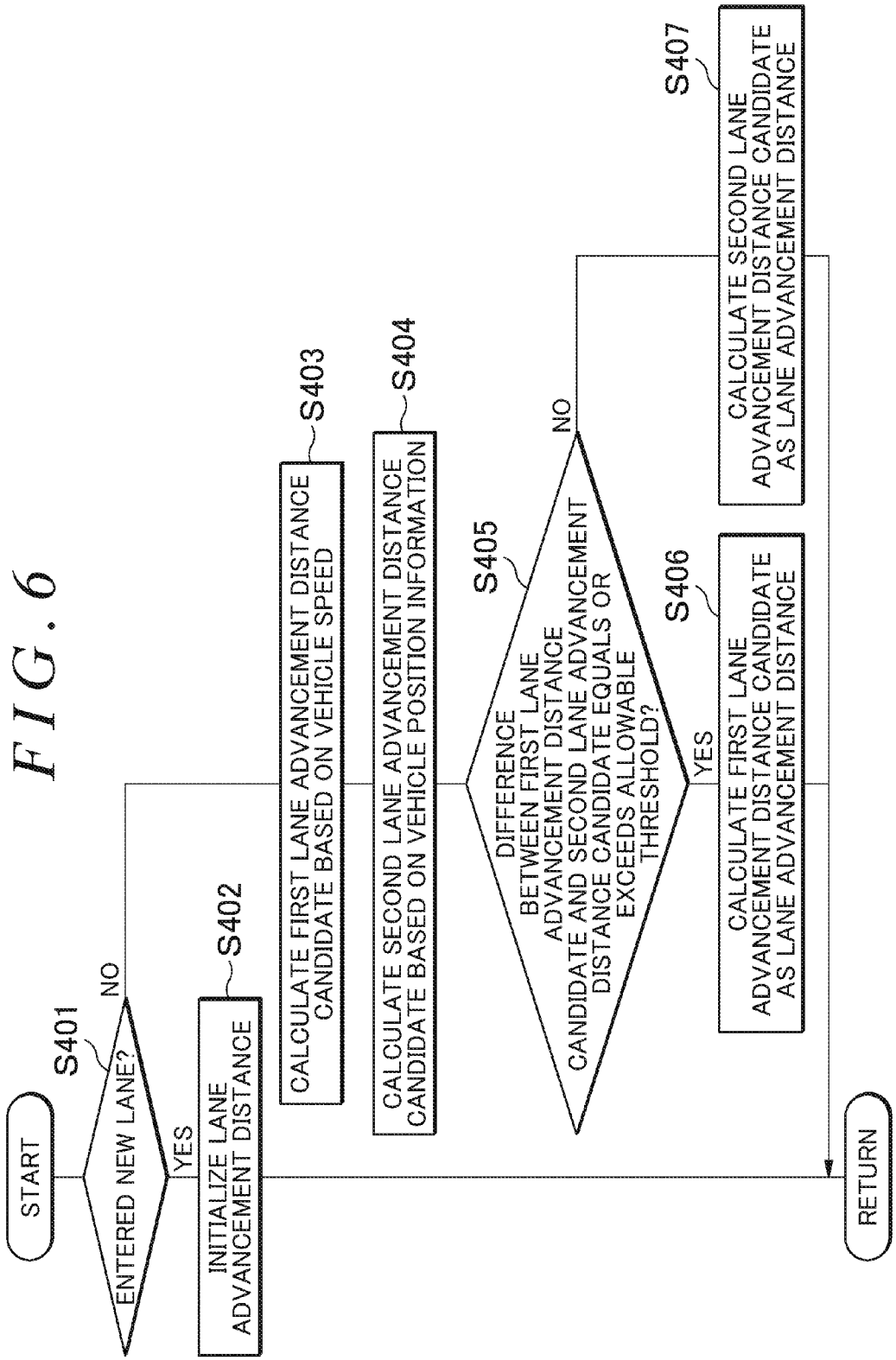
FIG. 6 is a flowchart showing lane travel distance calculation processing executed by the vehicle control apparatus.

Next, lane travel distance calculation processing executed by the vehicle control apparatus 1 according to this embodiment will be described. FIG. 6 is a flowchart showing the lane travel distance calculation processing executed by the vehicle control apparatus. The flowchart shown in FIG. 6 is executed repeatedly at preset time intervals when, for example, the vehicle M is operated by the vehicle control apparatus 1 (during automatic driving, for example).

As shown in FIG. 6, in S401, the ECU 2 determines whether or not the vehicle M has entered a new lane using the lane travel distance calculation unit 25. The lane travel distance calculation unit 25 determines that the vehicle M has entered a new lane on the basis of the map information and the position of the vehicle M when the vehicle M passes the intersection T, for example. When the ECU 2 determines that the vehicle M has entered a new lane (S401: YES), the routine advances to S402. When the ECU 2 determines that the vehicle M has not entered a new lane (S401: NO), the routine advances to S403.

In S402, the ECU 2 initializes the lane travel distance using the lane travel distance calculation unit 25. The lane travel distance calculation unit 25 sets the lane travel distance at zero. The ECU 2 then repeats the processing from S401 following the elapse of a preset time.

In S403, the ECU 2 calculates the first lane travel distance candidate using the lane travel distance calculation unit 25. The lane travel distance calculation unit 25 calculates the first lane travel distance candidate on the basis of the information indicating the position of the vehicle M, detected by the position detection unit 20. The lane travel distance calculation unit 25 calculates the first lane travel distance candidate from the distance on the lane between the position of the vehicle M and the lane entrance position in the map information, for example.

In S404, the ECU 2 calculates the second lane travel distance candidate using the lane travel distance calculation unit 25. The lane travel distance calculation unit 25 calculates the second lane travel distance candidate on the basis of the vehicle speed information (vehicle wheel speed information, for example) obtained by the vehicle speed sensor from the lane entrance position to the current location on the lane in which the vehicle M is currently traveling.

In S405, the ECU 2 uses the lane travel distance calculation unit 25 to determine whether or not the difference between the first lane travel distance candidate and the second lane travel distance candidate equals or exceeds the allowable threshold. When the ECU 2 determines that the difference between the first lane travel distance candidate and the second lane travel distance candidate equals or exceeds the allowable threshold (S405: YES), the routine advances to S406. When the ECU 2 determines that the difference between the first lane travel distance candidate and the second lane travel distance candidate does not equal or exceed the allowable threshold (S405: NO), the routine advances to S407.

In S406, the ECU 2 calculates the first lane travel distance candidate as the lane travel distance using the lane travel distance calculation unit 25. In S407, the ECU 2 calculates the second lane travel distance candidate as the lane travel distance using the lane travel distance calculation unit 25. The ECU 2 then repeats the processing from S401 following the elapse of a preset time.

Figure 7:
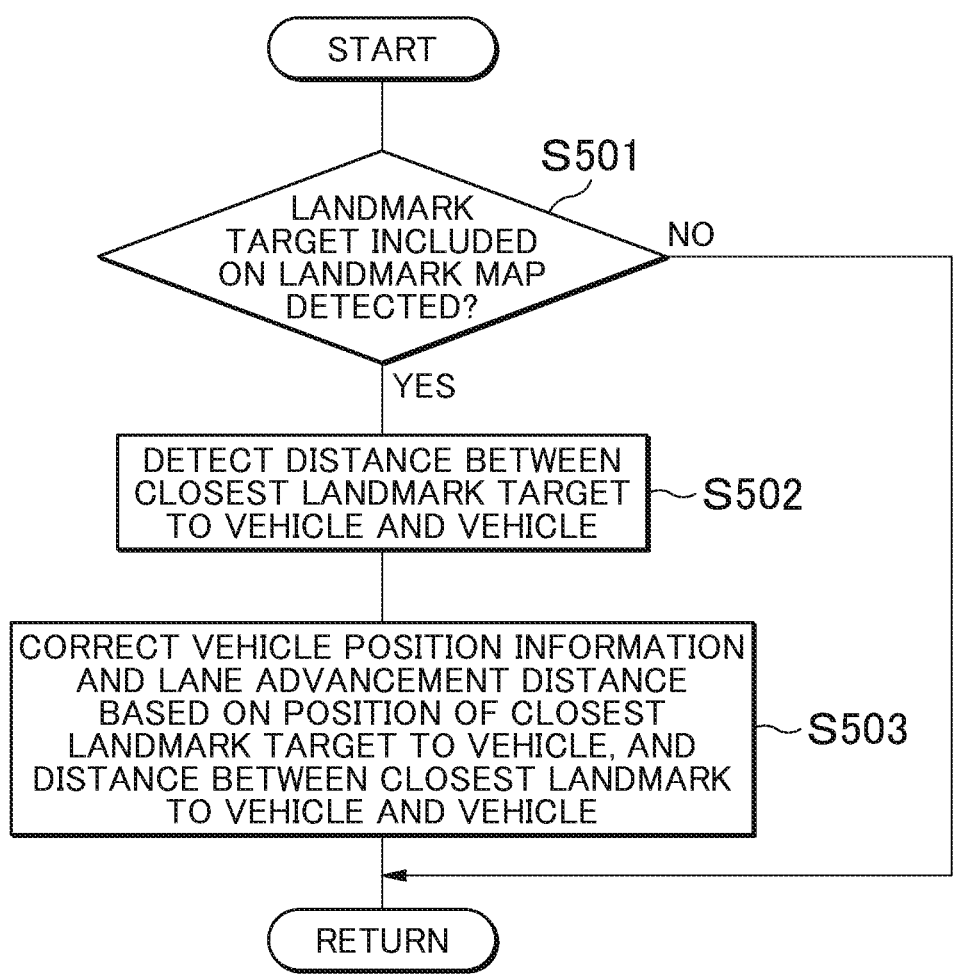
FIG. 7 is a flowchart showing position correction processing executed by the vehicle control apparatus using the landmark map.

Next, position correction processing executed by the vehicle control apparatus 1 according to this embodiment using the landmark map will be described. FIG. 7 is a flowchart showing the position correction processing executed by the vehicle control apparatus 1 using the landmark map. The flowchart shown in FIG. 7 is executed repeatedly at preset time intervals when, for example, the vehicle M is operated by the vehicle control apparatus 1 (during automatic driving, for example).

As shown in FIG. 7, in S501, the ECU 2 uses the target detection unit 21 to determine whether or not a landmark target included on the landmark map has been detected. The target detection unit 21 determines whether or not a landmark target has been detected in front of or behind the vehicle M by referring to the detection characteristic information of the landmark targets on the basis of the image information from the camera 8 or the obstruction information from the radar 9, for example. When the ECU 2 determines that a landmark target has not been detected (S501: NO), the current processing is terminated. The ECU 2 then repeats the processing from S501 following the elapse of a preset time. When the ECU 2 determines that a landmark target has been detected (S501: YES), the routine advances to S502.

In S502, the ECU 2 detects the distance between the landmark target and the vehicle M using the target distance detection unit 22. Note that when the target detection unit 21 detects a plurality of targets, the target distance detection unit 22 detects the distance between the vehicle M and the landmark target that is closest to the vehicle M. The target distance detection unit 22 detects the distance between the landmark target and the vehicle M on the basis of the obstruction information from the radar 9, for example.

In S503, the ECU 2 uses the position correction unit 23 to correct the information indicating the position of the vehicle M. The position correction unit 23 corrects the information indicating the position the vehicle M on the basis of the distance between the landmark target and the vehicle M and the position of the landmark target in the map information using the position (the xy coordinates) of the landmark target as a reference. Further, the position correction unit 23 corrects the lane travel distance of the vehicle M on the basis of the distance between the landmark target and the vehicle M and the position of the landmark target in the map information using the position (the lane travel distance) of the landmark target as a reference. The ECU 2 then repeats the processing from S501 following the elapse of a preset time.

Figure 8:
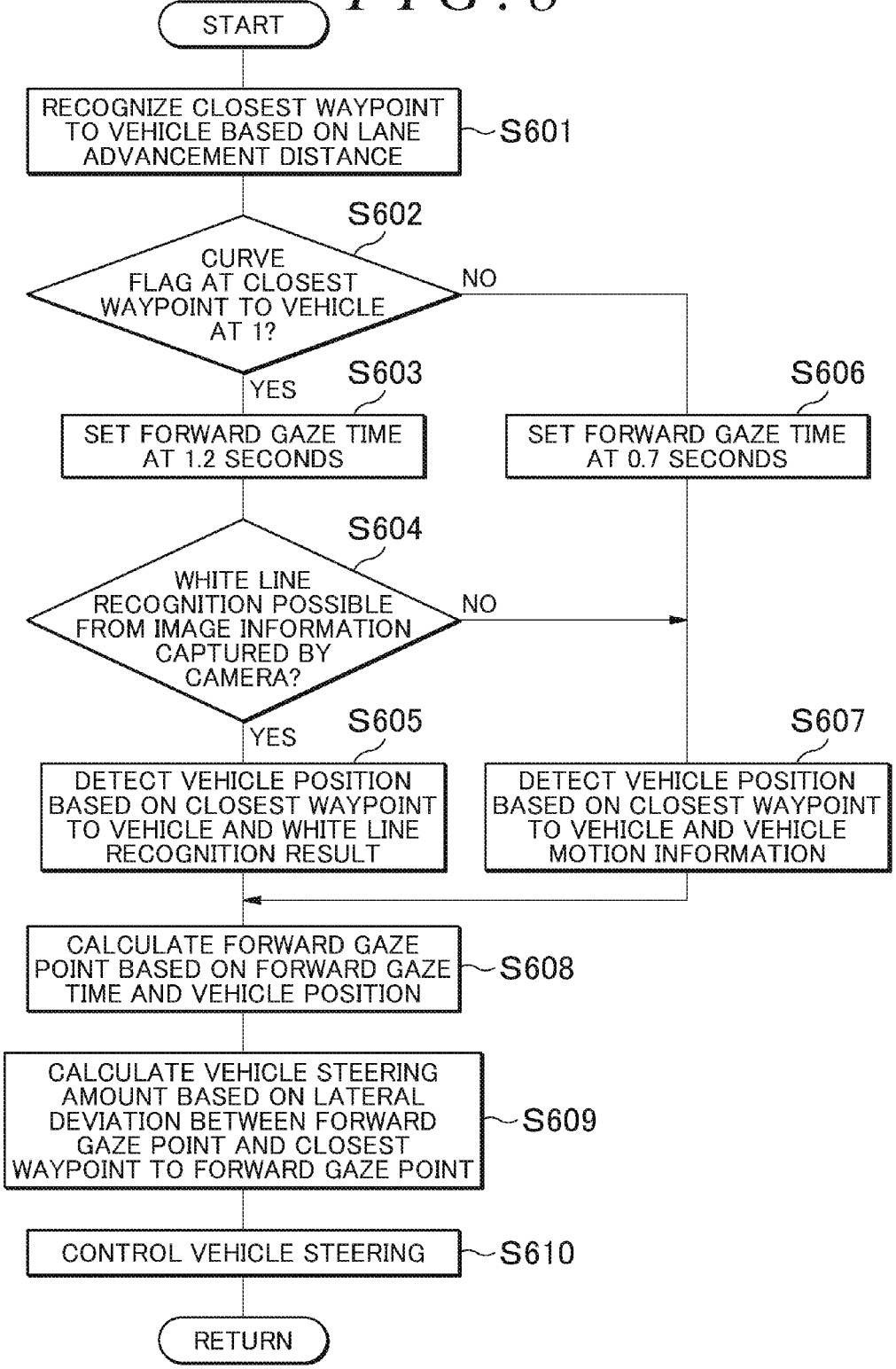
FIG. 8 is a flowchart showing steering control executed by the vehicle control apparatus using the waypoint map.

Next, steering control executed by the vehicle control apparatus 1 according to this embodiment using the waypoint map will be described. FIG. 8 is a flowchart showing the steering control executed by the vehicle control apparatus 1 using the waypoint map. The flowchart shown in FIG. 8 is executed repeatedly at preset time intervals when, for example, the vehicle M is operated by the vehicle control apparatus 1 (during automatic driving, for example).

As shown in FIG. 8, in S601, the ECU 2 uses the forward gaze point calculation unit 27 to recognize a waypoint in front of the vehicle M. The forward gaze point calculation unit 27 recognizes the closest waypoint to the vehicle M in front of the vehicle M on the basis of the lane travel distance of the vehicle M, for example.

In S602, the ECU 2 uses the forward gaze point calculation unit 27 to determine whether or not the curve flag at the closest waypoint to the vehicle M is at 1. When the ECU 2 determines that the curve flag at the waypoint is at 1 (S602: YES), the routine advances to S603. When the ECU 2 determines that the curve flag at the waypoint is not at 1 (S602: NO), the routine advances to S606.

In S603, the ECU 2 uses the forward gaze point calculation unit 27 to set the forward gaze time at the long time required for a curve (1.2 seconds, for example).

In S604, the ECU 2 determines whether or not white line recognition is possible using the forward gaze point calculation unit 27. The forward gaze point calculation unit 27 determines whether or not it is possible to recognize the white line defining the lane on the basis of the image information from the camera 8, for example. When the ECU 2 determines that white line recognition is possible (S604: YES), the routine advances to S605. When the ECU 2 determines that white line recognition is not possible (S604: NO), the routine advances to S607.

In S605, the ECU 2 uses the position detection unit 20 to detect the position (the xy coordinates) of the vehicle M on the basis of the closest waypoint to the vehicle M and a white line recognition result obtained from an image captured by the camera 8. The position detection unit 20 detects the position of the vehicle M on the basis of the closest waypoint to the vehicle M and the white line recognition result obtained from the image captured by the camera 8 in addition to the position information from the GPS reception unit 5, for example. The position detection unit 20 detects the position of the vehicle M in the length direction of the lane on the basis of the position information from the GPS reception unit 5 and the closest waypoint to the vehicle M. The position detection unit 20 detects the position (lateral position) of the vehicle M in the width direction of the lane on the basis of the white line detection result. After the position of the vehicle M is detected by the ECU 2, the routine advances to S608.

In S606, meanwhile, the ECU 2 uses the forward gaze point calculation unit 27 to set the forward gaze time at the normal time (0.7 seconds, for example). Next in S607, the ECU 2 uses the position detection unit 20 to detect the position (the xy coordinates) of the vehicle M on the basis of the closest waypoint to the vehicle M and motion information relating to the vehicle M. The motion information of the vehicle M is information relating to variation in the vehicle speed, acceleration, and yaw rate of the vehicle M, detected by the internal sensor 4. The position detection unit 20 detects the position of the vehicle M on the basis of the closest waypoint to the vehicle M and the motion information of the vehicle M in addition to the position information from the GPS reception unit 5. A conventional method may be used to detect the position of the vehicle M on the basis of the motion information of the vehicle M. After the position of the vehicle M is detected by the ECU 2, the routine advances to S608.

In S608, the ECU 2 calculates the forward gaze point using the forward gaze point calculation unit 27. The forward gaze point calculation unit 27 calculates the forward gaze point on the basis of the forward gaze time, the position of the vehicle M, and the vehicle speed of the vehicle M. For example, the forward gaze point calculation unit 27 calculates a point located ahead of the vehicle M by a distance obtained by multiplying the forward gaze time by the vehicle speed as the forward gaze point.

In S609, the ECU 2 calculates a steering amount (a steering angle or a steering torque) using the vehicle control unit 28. The vehicle control unit 28 calculates the steering amount on the basis of a lateral deviation (a deviation in the width direction of the lane) between the forward gaze point and the closest waypoint to the forward gaze point so that the lateral deviation is reduced. In S610, the ECU 2 executes steering control using the vehicle control unit 28. The vehicle control unit 28 executes steering control in accordance with the calculated steering amount by transmitting a control signal to the actuator 7. The ECU 2 then repeats the processing from S601 following the elapse of a preset time.

Next, vehicle speed control executed by the vehicle control apparatus 1 according to this embodiment using the waypoint map will be described. FIG. 9 is a flowchart showing the vehicle speed control executed by the vehicle control apparatus 1 using the waypoint map. The flowchart shown in FIG. 9 is executed repeatedly at preset time intervals when, for example, the vehicle M is operated by the vehicle control apparatus 1 (during automatic driving, for example).

As shown in FIG. 9, in S701, the ECU 2 recognizes a waypoint in front of the vehicle M using the forward gaze point calculation unit 27. Next, in S702, the ECU 2 uses the forward gaze point calculation unit 27 to determine whether or not the curve flag at the closest waypoint to the vehicle M is at 0. Note that in S701 and S702, the vehicle control unit 28 may be used instead of the forward gaze point calculation unit 27. When the ECU 2 determines that the curve flag at the waypoint is at 0 (S702: YES), the routine advances to S703. When the ECU 2 determines that the curve flag at the waypoint is not at 0 (S702: NO), the routine advances to S704.

In S703, the ECU 2 uses the vehicle control unit 28 to determine whether or not white line recognition has been performed on the basis of the image information from the camera 8 after passing through the immediately preceding steering modification point. When the ECU 2 determines that white line recognition has not been performed (S703: NO), the routine advances to S704. When the ECU 2 determines that white line recognition has been performed (S703: YES), the routine advances to S705.

In S704, the ECU 2 uses the vehicle control unit 28 to set the acceleration target vehicle speed at crawl speed. The acceleration target vehicle speed may be set within a range of 10 km/h to 40 km/h, for example. The ECU 2 then repeats the processing from S701 following the elapse of a preset time.

In S705, meanwhile, the ECU 2 uses the vehicle control unit 28 to determine whether or not the difference in the lane travel distance between the immediately preceding steering modification point and the next steering modification point equals or exceeds the difference threshold. The vehicle control unit 28 performs this determination on the basis of the waypoint map. When the ECU 2 determines that the difference in the lane travel distance between the immediately preceding steering modification point and the next steering modification point equals or exceeds the difference threshold (S705: YES), the routine advances to S706. When the ECU 2 determines that the difference in the lane travel distance between the immediately preceding steering modification point and the next steering modification point does not equal or exceed the difference threshold (S705: NO), the routine advances to S707.

In S706, the ECU 2 uses the vehicle control unit 28 to set the acceleration target vehicle speed at the upper limit speed. The ECU 2 then repeats the processing from S701 following the elapse of a preset time. In S707, the ECU 2 uses the vehicle control unit 28 to set the acceleration target vehicle speed at the intermediate speed. The ECU 2 then repeats the processing from S701 following the elapse of a preset time.

Figure 10B:
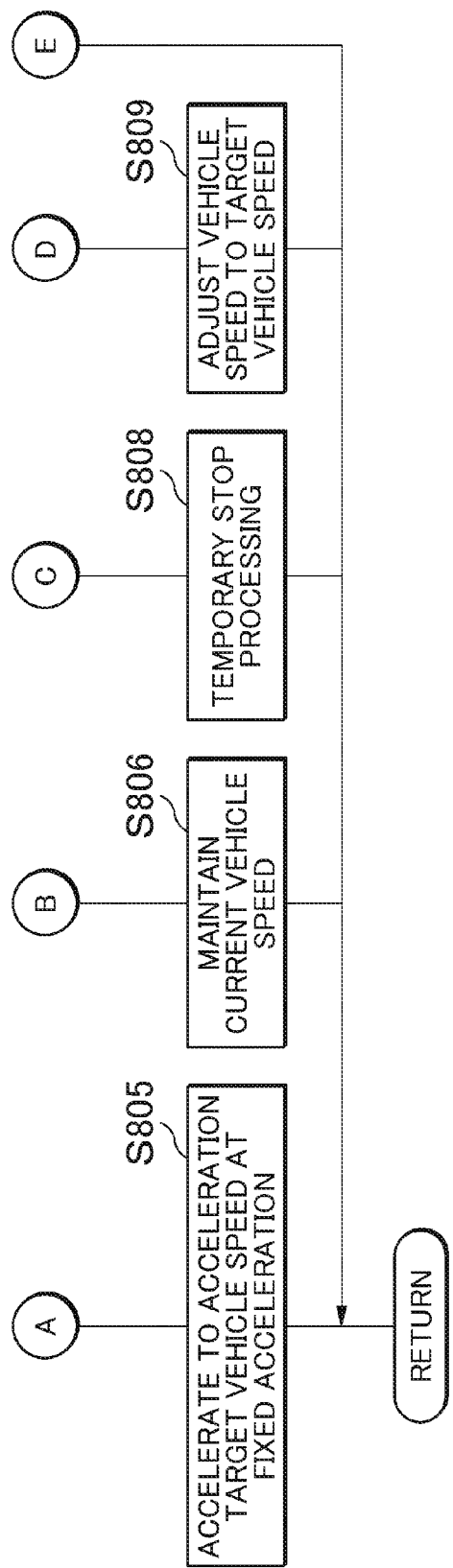
FIG. 10B is a flowchart showing vehicle speed control executed by the vehicle control apparatus using the control target map.

Next, steering control executed by the vehicle control apparatus 1 according to this embodiment using the control target map will be described. FIG. 10A and FIG. 10B is a flowchart showing the steering control executed by the vehicle control apparatus 1 using the control target map. The flowchart shown in FIG. 10A and FIG. 10B is executed repeatedly at preset time intervals when, for example, the vehicle M is operated by the vehicle control apparatus 1 (during automatic driving, for example).

As shown in FIG. 10A and FIG. 10B, in S801, the ECU 2 uses the vehicle control unit 28 to determine whether or not the distance on the route between the vehicle M and the next vehicle speed target point equals or exceeds the distance threshold. When the vehicle M and the vehicle speed target point are positioned on the same lane, the distance on the route between the vehicle M and the next vehicle speed target point is equal to a distance between the lane travel distance of the vehicle M and the lane travel distance of the next vehicle speed target point. When the ECU 2 determines that the distance on the route between the vehicle M and the next vehicle speed target point is greater than the distance threshold (S801: NO), the current control is terminated. The ECU 2 then repeats the processing from S801 following the elapse of a preset time. When the ECU 2 determines that the distance on the route between the vehicle M and the next vehicle speed target point is not greater than the distance threshold (S801: YES), the routine advances to S802.

In S802, the ECU 2 uses the vehicle control unit 28 to calculate the required deceleration distance required for the vehicle M to reach the target vehicle speed at the vehicle speed target point at a preset deceleration. The vehicle control unit 28 calculates the required deceleration distance on the basis of the current vehicle speed and the target vehicle speed at the vehicle speed target point.

In S803, the ECU 2 uses the vehicle control unit 28 to determine whether or not the distance on the route between the vehicle M and the next vehicle speed target point is greater than the required deceleration distance. When the ECU 2 determines that the distance on the route between the vehicle M and the next vehicle speed target point is greater than the required deceleration distance (S803: YES), the routine advances to S804. When the ECU 2 determines that the distance on the route between the vehicle M and the next vehicle speed target point is not greater than the required deceleration distance (S803: NO), the routine advances to S807.

In S804, the ECU 2 uses the vehicle control unit 28 to determine whether or not the difference between the current vehicle speed and the acceleration target vehicle speed is no greater than the acceleration threshold. When the ECU 2 determines that the difference between the current vehicle speed and the acceleration target vehicle speed is greater than the acceleration threshold (S804: NO), the routine advances to S805. When the ECU 2 determines that the difference between the current vehicle speed and the acceleration target vehicle speed is not greater than the acceleration threshold (S804: YES), the routine advances to S806.

In S805, the ECU 2 uses the vehicle control unit 28 to accelerate the vehicle M to the acceleration target vehicle speed at a fixed acceleration. The ECU 2 then repeats the processing from S801 following the elapse of a preset time. In S806, the ECU 2 uses the vehicle control unit 28 to maintain the current vehicle speed. The ECU 2 then repeats the processing from S801 following the elapse of a preset time.

In S807, the ECU 2 uses the vehicle control unit 28 to determine whether or not the target vehicle speed at the next vehicle speed target point is 0 km/h. When the ECU 2 determines that the target vehicle speed at the next vehicle speed target point is 0 km/h (S807: YES), the routine advances to S808. When the ECU 2 determines that the target vehicle speed at the next vehicle speed target point is not 0 km/h (S807: NO), the routine advances to S809.

In S808, the ECU 2 uses the vehicle control unit 28 to perform the temporary stop processing. The ECU 2 then repeats the processing from S801 following the elapse of a preset time. In S809, the ECU 2 uses the vehicle control unit 28 to adjust the vehicle speed of the vehicle M to the target vehicle speed of the vehicle speed target point. The ECU 2 then repeats the processing from S801 following the elapse of a preset time.

With the vehicle control apparatus 1 according to this embodiment, as described above, the lane travel map data used as the vehicle M travels along the route are generated from the steering modification points, such as curves, and the vehicle speed target points, such as temporary stop lines, associated with the map information. Hence, there is no need to store a large amount of data constituted by target positions and target vehicle speeds of the vehicle at fixed distance intervals at all times in association with the map information, and as a result, the vehicle M can be controlled to travel along the route from the current location to the destination using a small amount of data stored in the point information storage unit 11.

Moreover, according to the vehicle control apparatus 1, the lane travel map data are generated for each lane, and therefore continuity among the data (the lane travel map data) can be secured more easily than when vehicle positioning is performed by simultaneous localization and mapping [SLAM] technology using an all-round type radar, for example. According to the vehicle control apparatus 1, therefore, unevenness in the travel control performed on the vehicle M due to deviation among data having poor continuity can be avoided, and as a result, travel can be achieved smoothly in the vehicle M.

Further, in the vehicle control apparatus 1, the position of the vehicle M may be corrected using the landmark targets. In this case, in the vehicle control apparatus 1, the position of the vehicle can be corrected using landmark targets located in fixed positions relative to the lane, and therefore the precision of the vehicle position can be improved. Hence, according to the vehicle control apparatus 1, travel by the vehicle can be controlled with a high degree of precision using highly precise vehicle position information. Similarly, in the vehicle control apparatus 1, the lane travel distance of the vehicle M may be corrected using the landmark targets. In this case, in the vehicle control apparatus 1, the lane travel distance of the vehicle can be corrected using landmark targets located in fixed positions relative to the lane, and therefore the precision of the lane travel distance of the vehicle can be improved. Hence, according to the vehicle control apparatus 1, travel by the vehicle can be controlled with a high degree of precision using a lane travel distance calculated precisely in relation to the vehicle.

A preferred embodiment of the invention was described above, but the invention is not limited to the above embodiment. Various modifications and amendments may be implemented on the invention, including the embodiment described above, on the basis of knowledge possessed by persons skilled in the art.

What is claimed is:

1. A vehicle control apparatus comprising:
   a storage apparatus configured to store a steering modification point of a vehicle and a vehicle speed target point of the vehicle that are associated with map information; and
   an electronic control unit configured to:
   detect a position of the vehicle;
   detect a travel direction of the vehicle;
   calculate a lane travel distance that is a distance traveled by the vehicle along a lane from a lane entrance position in which the vehicle enters the lane, the lane being defined as a strip of a road between two intersections, such that a plurality of the lanes forms a route that extends from a current location to a destination, on the basis of the map information, the position of the vehicle, and the travel direction of the vehicle;
   generate, for each lane, lane travel map data including a target position of the vehicle, a target direction of the vehicle, and a target vehicle speed of the vehicle, the target position, target direction, and target vehicle speed corresponding to the lane travel distance, on the basis of the map information, the steering modification point, the vehicle speed target point, the position of the vehicle, and the travel direction of the vehicle; and
   output a control signal to control the vehicle on the basis of the position of the vehicle, the lane travel distance of the vehicle, and the lane travel map data.

2. The vehicle control apparatus according to claim 1, wherein the storage apparatus is configured to store, in association with the map information, target information relating to a landmark target located in a fixed position relative to the lane, and the electronic control unit is configured to:
detect a landmark target in front of or behind the vehicle,
detect a distance from the vehicle to the landmark target, and
correct the position of the vehicle on the basis of the distance from the vehicle to the landmark target.

3. The vehicle control apparatus according to claim 2, wherein
the electronic control unit is configured to correct the lane travel distance of the vehicle on the basis of the distance from the vehicle to the landmark target.

4. The vehicle control apparatus according to claim 1, wherein the steering modification point includes a curvature of radius and an angle of a turn.

5. The vehicle control apparatus according to claim 1, wherein the vehicle target speed point includes a speed of the vehicle at the target position of the vehicle.

* * * * *